UNITED STATES PATENT OFFICE.

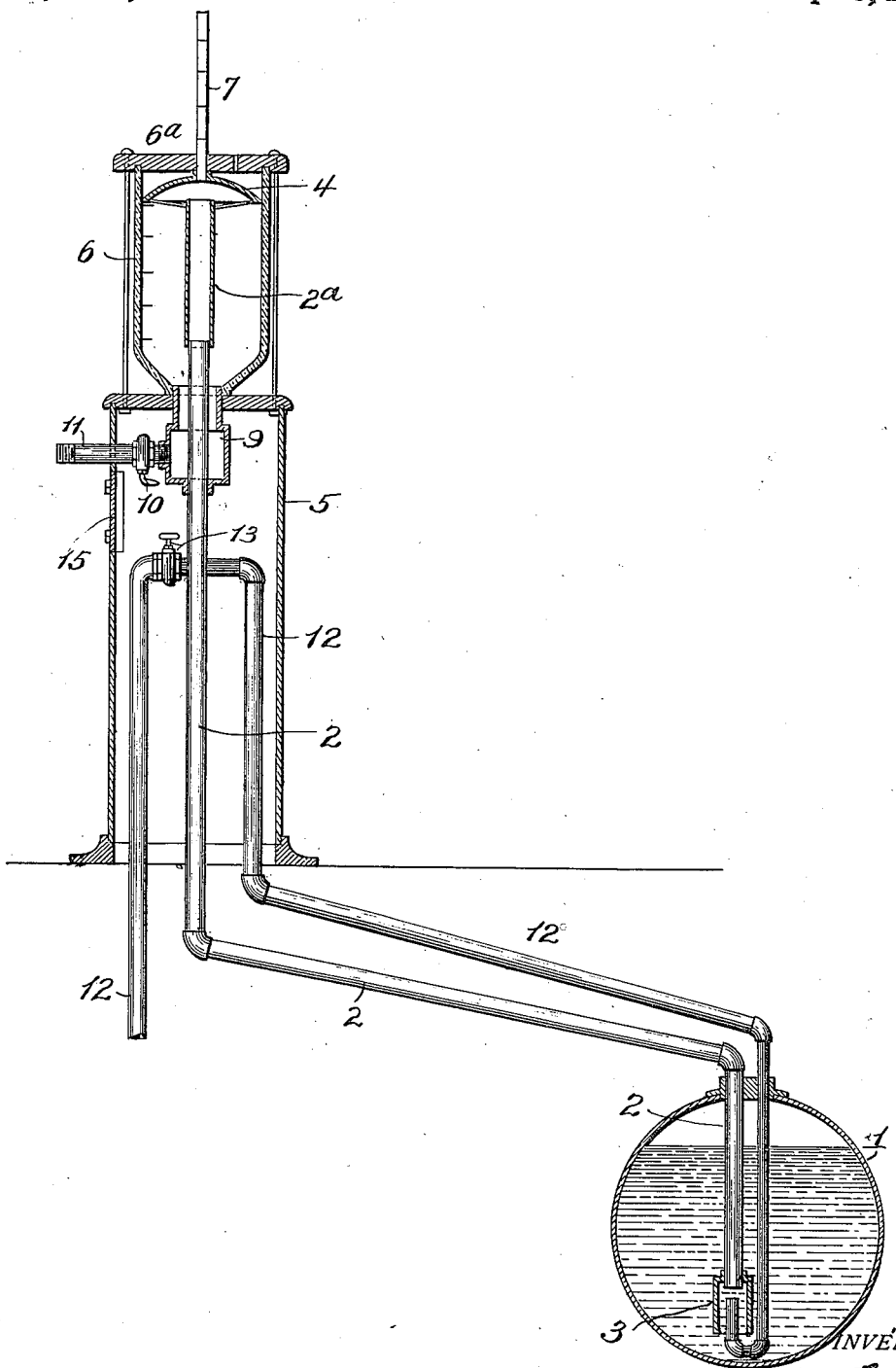

ABNER JUDSON McGEHEE, OF JACKSON, TENNESSEE.

GASOLENE SERVICE-TANK.

1,374,020.  Specification of Letters Patent.  Patented Apr. 5, 1921.

Application filed October 4, 1919. Serial No. 328,526.

*To all whom it may concern:*

Be it known that I, ABNER J. MCGEHEE, a citizen of the United States, and a resident of Jackson, in the county of Madison and State of Tennessee, have invented certain new and useful Improvements in Gasolene Service-Tanks; and I do hereby declare the following to be a full, clear, and exact description of the invention, such as will enable others skilled in the art to which it appertains to make and use the same.

My invention relates to an improvement in gasolene service tanks, and is designed as an improvement on the construction disclosed in my application Serial Number 320,763, filed August 30th, 1919.

In the apparatus disclosed in my application referred to, the coupling or injector for forcing the gasolene to the dispensing tank, is removed from the main supply tank, and is shown in a plane below the bottom of the tank so that the gasolene is supplied to it by gravity and it and the pipe connecting it with the main tank are always filled with gasolene.

The object of the invention is to so locate the parts that all the gasolene between the dispensing tank and main tank will flow back into the latter immediately upon the withdrawal of the air pressure. A further object is to provide improved means for accurately measuring the desired quantity of gasolene, and permitting any surplus to flow back into the main tank.

With these and other objects in view my invention consists in the parts and combination of parts as will be more fully explained and pointed out in the claims.

The accompanying drawings is a view in vertical longitudinal section partly in elevation of my improvement.

1 is the main tank located in a pit underground, and 2 is a pipe entering the tank at the top and carrying at its lower open end the inverted cup 3 the open end of which is located slightly above the bottom of the tank. This cup 3 constitutes an enlargement or bell mouth for the free lower end of the pipe 2, and it and the pipe 2 are always full of gasolene up to the level of the latter in the tank.

The pipe 2 passes up above the surface of the ground and is open at its upper end. Surrounding the open end of the pipe 2 is the dispensing tank 6 preferably cylindrical in form and closed at its upper end by the head $6^a$, which may have a vent therein for the escape of air which enters the tank with the gasolene.

The tank 6 is supported on the stand 5 and is graduated to indicate the contents in gallons and is made of glass or other transparent material, or is provided with an opening throughout its length covered with glass or other material or with a sight tube, so that the height of the gasolene in the tank 6 will be clearly visible and may be seen by the customers.

This tank is seated on and secured to the stand 5 and is provided at its bottom with a reduced neck connected by a coupling 9 with the discharge pipe 11, to which a discharge hose (not shown) is attached, the pipe 11 being provided with a valve 10 for controlling the discharge of gasolene from the dispensing tank.

Pipe 2 terminates within tank 6 in or below the horizontal plane of the gallon mark on said tank, and is surrounded by the sleeve $2^a$ open at its upper end and attached at said upper end to the dome 4, having a stem 7 projecting upwardly through the cover $6^a$ of the tank 6. This stem is marked to indicate gallons and is designed to be adjusted up and down so as to carry and adjust the top open end of the sleeve $2^a$ into the plane of the measure marks on the indicator. As before explained the upper end of pipe 2 terminates in the plane of or below the one gallon mark on the tank and the sleeve $2^a$ which telescopes with said pipe may be adjusted or moved downwardly until its upper end is in line with the gallon mark, or moved upwardly until its upper end is in the plane of any one of the measuring marks, which positions, are indicated by the graduation or marks on the stem 7.

12 is a pipe leading from an air reservoir compressor or other source of air under pressure. This pipe passes upwardly into the stand 5 to a point within reach of the operator and then downwardly and into tank 1, the lower end of said pipe being carried under the cup or bell 3 and upwardly into the latter and terminates adjacent to the lower end of the pipe 2 and in the vertical plane of the lower end thereof. Pipe 12 is provided preferably at the point where it turns in the stand 5, with the valve 13, which together with the valve 10 in the discharge pipe 11, will be accessible to the operator through the opening in the stand 5 closed by the door 15, hence when the door 15 is closed and locked the controlling valves will be concealed and inaccessible.

Pipe 2 passes through coupling 9 attached to the lower end of tank 6, and through the restricted neck of the tank, sufficient space being left in the neck for the free descent of the sleeve 2ᵃ and also for the free passage of the gasolene to the discharge pipe 11 when the sleeve is in its downward position.

Normally the dispensing tank 6 and that part of pipe 2 outside of tank 1 are empty, and when the air valve 13 is opened the air is discharged from the lower open end of pipe 12 into the bell 3 and against the gasolene in the latter and also in the part of the pipe 2 within tank 1 and operating on the injector principle, forces the gasolene up pipe 2 and into the dispensing tank 6. If for instance a customer wants three gallons, the stem 7 would be adjusted to the three gallon point. This as previously explained elevates the upper open end of the sleeve 2ᵃ to the horizontal plane of the three gallon mark, and the gasolene flows over the end of the sleeve and into the tank 6. When the level of the gasolene in the tank reaches the three gallon level, the air should be shut off, and when the pressure is discontinued the gasolene in pipe 2 flows back into the tank 1 and any surplus that may have entered tank 6 will flow over the top of the sleeve into pipe 2 and back into tank 1. The highest position of the sleeve in the tank represents the measuring capacity of the dispensing tank, hence by lowering the sleeve any quantity less than capacity can be accurately measured and retained until released through the discharge pipe 11.

The upper end of the sleeve 2ᵃ terminates above the lower edge of the dome, 4 hence when the lower edge of the dome becomes submerged in the gasolene, the air rising with the gasolene is trapped in the dome and operates to stop or retard the upward flow through the pipe, any surplus however, that may enter will flow back into pipe 2 over the top end of the sleeve just as soon as the air is cut off from pipe 12.

With the apparatus it is only necessary for the operator to first adjust the sleeve to proper position for the number of gallons required by the customer, and then open air valve 13, and when the desired amount has entered the tank, the supply can be instantly cut off by closing valve 13.

It is evident that many slight changes might be resorted to in the relative arrangement of parts shown and described without departing from the spirit and scope of my invention. Hence I would have it understood that I do not wish to confine myself to the exact construction and arrangement of parts shown and described, but—

Having fully described my invention what I claim as new and desired to secure by Letters Patent, is:—

1. In a gasolene dispensing apparatus, the combination of a main tank, a dispensing tank, a gasolene supply pipe leading from the main tank to the dispensing tank and communicating with both, the end of the pipe within the main tank terminating near the bottom of the latter in an enlargement open at its lower end, a pipe leading from a source of compressed air and discharging into the enlarged end of the pipe leading to the dispensing tank, a discharge pipe from the latter, a valve in the discharge pipe and a valve in the air pipe.

2. In a gasolene dispensing apparatus, the combination of a main tank, a dispensing tank, a gasolene supply pipe connecting the two tanks, and terminating near the bottom of the main tank in an inverted cup shaped extension, a pipe leading from a source of compressed air and discharging into said cup shaped extension and in alinement with the lower end of said pipe, a discharge pipe connected with the dispensing tank, a valve in the discharge pipe and a valve in the air pipe.

3. In a gasolene dispensing apparatus, the combination of a dispensing tank, a main supply tank, a fixed continuously open pipe leading from the main tank to the dispensing tank and terminating in or below a horizontal plane representing the level of the minimum quantity of gasolene that can be measured by the dispensing tank, a vertically movable sleeve surrounding the upper open end of said supply pipe and manually actuated means for adjusting said sleeve vertically whereby the level of the gasolene supplied to the tank may be varied.

4. In a gasolene dispensing apparatus, the combination of a dispensing tank, a pipe for supplying gasolene to the latter, a sleeve surrounding the upper end of said pipe and adapted to be moved vertically thereon, and a graduated stem connected to said sleeve and passing through the top of the dispensing tank.

5. In a gasolene dispensing apparatus, the combination of a dispensing tank, a gasolene supply pipe leading to the same, the discharge end of said pipe being disposed vertically, a movable extension surrounding the upper end of said pipe, a dome located over the extension and connected with the latter and a stem connected with the dome for moving it and the extension vertically within the dispensing tank.

In testimony whereof I have signed this specification in the presence of two subscribing witnesses.

ABNER JUDSON McGEHEE.

Witnesses:
Jno. M. Carroll,
Matie Fletcher.